(12) United States Patent
Rajagopalan et al.

(10) Patent No.: US 11,064,591 B2
(45) Date of Patent: Jul. 13, 2021

(54) FLOODING LOCALIZATION AND SIGNALLING VIA INTELLIGENT LIGHTING

(71) Applicant: SIGNIFY HOLDING B.V., Eindhoven (NL)

(72) Inventors: Ruben Rajagopalan, Neuss (DE); Harry Broers, S-Hertogenbosch (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 180 days.

(21) Appl. No.: 16/335,935

(22) PCT Filed: Sep. 20, 2017

(86) PCT No.: PCT/EP2017/073765
§ 371 (c)(1),
(2) Date: Mar. 22, 2019

(87) PCT Pub. No.: WO2018/054968
PCT Pub. Date: Mar. 29, 2018

(65) Prior Publication Data
US 2019/0313510 A1    Oct. 10, 2019

(30) Foreign Application Priority Data
Sep. 22, 2016  (EP) .................................... 16190027

(51) Int. Cl.
*G01S 17/88*    (2006.01)
*H05B 47/105*   (2020.01)
(Continued)

(52) U.S. Cl.
CPC .......... *H05B 47/105* (2020.01); *G01S 7/4865* (2013.01); *G01S 17/10* (2013.01);
(Continued)

(58) Field of Classification Search
CPC .. H05B 47/105; H05B 47/155; H05B 47/175; G01S 7/4865; G01S 17/10; G01S 17/88; G01W 1/14; G08B 5/36; Y02B 20/40
See application file for complete search history.

(56) References Cited

U.S. PATENT DOCUMENTS 9,084,311 B2    7/2015  Saito et al.
2014/0239808 A1  8/2014  Nava et al.
(Continued)

FOREIGN PATENT DOCUMENTS

CN    105865567 A    8/2016
CN    205447533 U    8/2016
(Continued)

OTHER PUBLICATIONS

English translation for KR-101092093-B1. (Year: 2011).*
"Evaluation of Ultrasonic Snow Depth Sensors for Automated Surface Observing Systems (ASOS)" by Brazenec. (Year: 2005).*

*Primary Examiner* — Xin Y Zhong

(57) ABSTRACT

A method (300) for detecting a dangerous environmental condition within a lighting environment (100) includes the steps of: providing (310) a lighting network (200) having a plurality of lighting units (10) each with a light source (12), at least some of the plurality of lighting units including a range sensor (32); obtaining (330), by the range sensors, range information; determining (360), based at least in part on the obtained range information, a depth of precipitation or accumulation at a first lighting unit; and determining (370), based on the determined depth, a dangerous environmental condition at the first lighting unit.

14 Claims, 3 Drawing Sheets

(51) Int. Cl.
   *G01S 7/4865*   (2020.01)
   *G01S 17/10*    (2020.01)
   *G01W 1/14*     (2006.01)
   *G08B 5/36*     (2006.01)
   *H05B 47/155*   (2020.01)
   *H05B 47/175*   (2020.01)

(52) U.S. Cl.
   CPC ............... *G01S 17/88* (2013.01); *G01W 1/14* (2013.01); *G08B 5/36* (2013.01); *H05B 47/155* (2020.01); *H05B 47/175* (2020.01)

(56) References Cited

U.S. PATENT DOCUMENTS

| | | |
|---|---|---|
| 2015/0296593 A1 | 10/2015 | So |
| 2016/0148506 A1 | 5/2016 | De Oliveira et al. |

FOREIGN PATENT DOCUMENTS

| | | | |
|---|---|---|---|
| DE | 102014206074 | A1 | 10/2015 |
| JP | S6415692 | A | 1/1989 |
| JP | H0850182 | A2 | 2/1996 |
| JP | 2002235450 | A | 8/2002 |
| JP | 2012198652 | A | 10/2012 |
| JP | 2013068449 | A | 4/2013 |
| JP | 2013200866 | A | 10/2013 |
| KR | 2011120763 | A | 11/2011 |
| KR | 101092093 | B1 * | 12/2011 |
| KR | 2014096742 | A | 8/2014 |
| WO | 2013093771 | A1 | 6/2013 |
| WO | 2016021238 | A1 | 2/2016 |
| WO | 2016086421 | A1 | 6/2016 |

* cited by examiner

300

```
┌─────────────────────────────────────────────────────────────────────────────┐
│ Provide a lighting network with a plurality of lighting units comprising one │
│                  or more light sources and a range sensor                   │
│                                    310                                      │
└─────────────────────────────────────────────────────────────────────────────┘
```

Illuminate a target surface with the light source
320

Obtain range information using the range sensor
330

392

Communicate the obtained range information
340

Determine a depth or level of precipitation or other accumulation at the lighting unit
360

Determine a type of precipitation or other accumulation at the lighting unit
350

Determine that flooding or other dangerous environmental condition exists at the lighting unit
370

Respond, by the light source, to the determined flooding or other dangerous environmental condition
390

Communicate the determined flooding or other dangerous environmental condition
380

FIG. 3

FLOODING LOCALIZATION AND SIGNALLING VIA INTELLIGENT LIGHTING

CROSS-REFERENCE TO PRIOR APPLICATIONS

This application is the U.S. National Phase application under 35 U.S.C. § 371 of International Application No. PCT/EP2017/073765, filed on Sep. 20, 2017, which claims the benefit of European Patent Application No. 16190027.9, filed on Sep. 22, 2016. These applications are hereby incorporated by reference herein.

FIELD OF THE INVENTION

The present disclosure is directed generally to methods and lighting systems configured to monitor environmental conditions, and more specifically, to a precipitation detection and warning system using a lighting network.

BACKGROUND

Around the world, an increasing number of weather events every year prove to be deadly, destructive, and prohibitively expensive. Often, these weather events are either completely unpredicted or are under-estimated, meaning that residents are not given proper warning. This can result in greater casualties and destruction compared to events where residents are able to plan or rush to safety.

Weather events with large amounts of precipitation can result in extensive flooding. Flash floods, for example, are extremely dangerous and destructive anywhere in the world that they occur. According to the World Meteorological Organization, flash floods are the most lethal form of natural hazard based upon the ratio of fatalities to people affected, and cause millions of dollars in property damage every year. This is because flash floods, which are flood events of short duration with a relatively high peak discharge, tend to occur frequently but at a very small scale. Flash floods often impact poorer populations in remote locations, and while they rarely capture news headlines, they can severely undermine a region's development.

Localized and less extreme accumulation of precipitation can be deadly as well. For example, localized flooding can wash out a road, railroad track, or other transportation mechanism. Unexpected snow accumulations can make travel conditions extremely dangerous. In addition to these situations, there are many other examples of dangerous precipitation accumulation.

Prediction systems and early warning systems are key to significantly reducing the fatalities and destruction caused by weather events such as storms, flooding, flash floods, and others. Existing prediction and early warning systems, however, are costly and require the installation and distribution of specialized weather stations which can be prohibitively expensive for poorer populations in remote locations most affected by dangerous weather events. In addition, these prediction and warning systems tend to be sparsely distributed, with the result that localized weather events like flash flooding or variable precipitation accumulations are not adequately detected.

Accordingly, there is a continued need in the art for early detection and warning systems which are affordable to implement and capable of detecting localized weather events.

SUMMARY OF THE INVENTION

The present disclosure is directed to inventive methods and apparatus for a lighting network configured to provide weather event detection and warning. Various embodiments and implementations herein are directed to a networked lighting system comprising multiple distributed lighting units, such as streetlights, each with an integrated range sensor. The reflected signals detected by each integrated range sensor are analyzed to estimate the depth and/or type of precipitation accumulation located beneath or around the lighting unit. The depth and type information can be used, alone or in combination with topographical information such as an elevation map, to determine whether a potentially dangerous situation exists or might exist. The information can also be utilized to create a depth map, or a flood map, for the area covered by the distributed lighting system network, although the system may also be able to extrapolate flooding for areas located between, but not directly measured by, a lighting unit. The information obtained by the distributed lighting system network can be utilized to warn local residents of the potentially dangerous situation.

Generally, in one aspect, a method for detecting a dangerous environmental condition within a lighting environment is provided. The method includes the steps of: (i) providing a lighting network comprising a plurality of lighting units each comprising a light source, at least some of the plurality of lighting units each comprising a range sensor; (ii) obtaining, by the range sensors, range information; (iii) determining, based at least in part on the obtained range information, a depth of precipitation or accumulation at a first lighting unit; and (iv) determining, based on the determined depth, a dangerous environmental condition at the first lighting unit.

According to an embodiment, the dangerous environmental condition comprises flooding. According to an embodiment, the dangerous environmental condition comprises snow or ice accumulation.

According to an embodiment, the method further includes the step of determining, using the range information, a type of precipitation or accumulation at a lighting unit.

According to an embodiment, the method further includes the step of communicating, by the lighting unit, the range information.

According to an embodiment, the method further includes the step of communicating the determined dangerous environmental condition at the first lighting unit.

According to an embodiment, the method further includes the step of responding, by the first lighting unit, to the determined dangerous environmental condition. According to an embodiment, the step of responding to the determined dangerous environmental condition comprises modifying the light source of the first lighting unit.

According to an embodiment, the method further includes the step of extrapolating, by the lighting network, a dangerous environmental condition at a location within the lighting network other than at the first lighting unit.

According to an embodiment, the range sensor is a time-of-flight sensor.

According to an aspect, a lighting unit configured to detect a dangerous environmental condition within a lighting environment is provided. The lighting unit includes: (i) a light source configured to illuminate at least a portion of the lighting environment; (ii) a range sensor configured to obtain one or more range measurements within the lighting environment; and (iii) a controller configured to: determine, based at least in part on the obtained one or more range measurements, a depth of precipitation or accumulation within the lighting environment; and determine, based on the determined depth, a dangerous environmental condition at the first lighting unit.

According to an embodiment, the controller is further configured to modify, in response to a determined dangerous environmental condition, the light source of the first lighting unit. According to an embodiment, the controller is further configured to communicate the determined dangerous environmental condition.

According to an aspect, a lighting network configured to detect a dangerous environmental condition within a lighting environment is provided. The lighting network includes: a plurality of lighting units each comprising a light source, at least some of the plurality of lighting units each comprising a range sensor, wherein each of the range sensors is configured to obtain one or more range measurements within the lighting environment; and a processor configured to: (i) determine, based at least in part on the obtained one or more range measurements, a depth of precipitation or accumulation within the lighting environment; and (ii) determine, based on the determined depth, a dangerous environmental condition at one or more of the plurality of lighting units.

According to an embodiment, the controller is further configured to modify, in response to a determined dangerous environmental condition, the light source of the first lighting unit.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 3 is a flowchart of a method for detecting an environmental condition within a lighting environment, in accordance with an embodiment.

DETAILED DESCRIPTION OF EMBODIMENTS

The present disclosure describes various embodiments of a lighting unit or lighting system configured to provide weather event detection and warning. More generally, Applicant has recognized and appreciated that it would be beneficial to provide a lighting unit, fixture, network, and system configured to obtain range information in the vicinity of the lighting unit. A particular goal of utilization of certain embodiments of the present disclosure is to characterize the depth and/or type of precipitation accumulating within the vicinity of the lighting unit, and provide a warning if the accumulation exceeds a predetermined amount.

In view of the foregoing, various embodiments and implementations are directed to a distributed lighting system network comprising a plurality of lighting units each with an integrated range sensor configured to obtain range information in the vicinity of the lighting unit. A controller of the lighting unit or the lighting system network evaluates the range information for a lighting unit or a plurality of lighting units and creates a depth map, or a flood map, for the area covered by lighting unit and/or the distributed lighting system network. The lighting system can then determine whether a potentially dangerous situation exists or might exist, or can communicate the information for an external determination. Accordingly, the information obtained by the distributed lighting system network can be utilized to warn local residents of the potentially dangerous situation.

Figure 1:
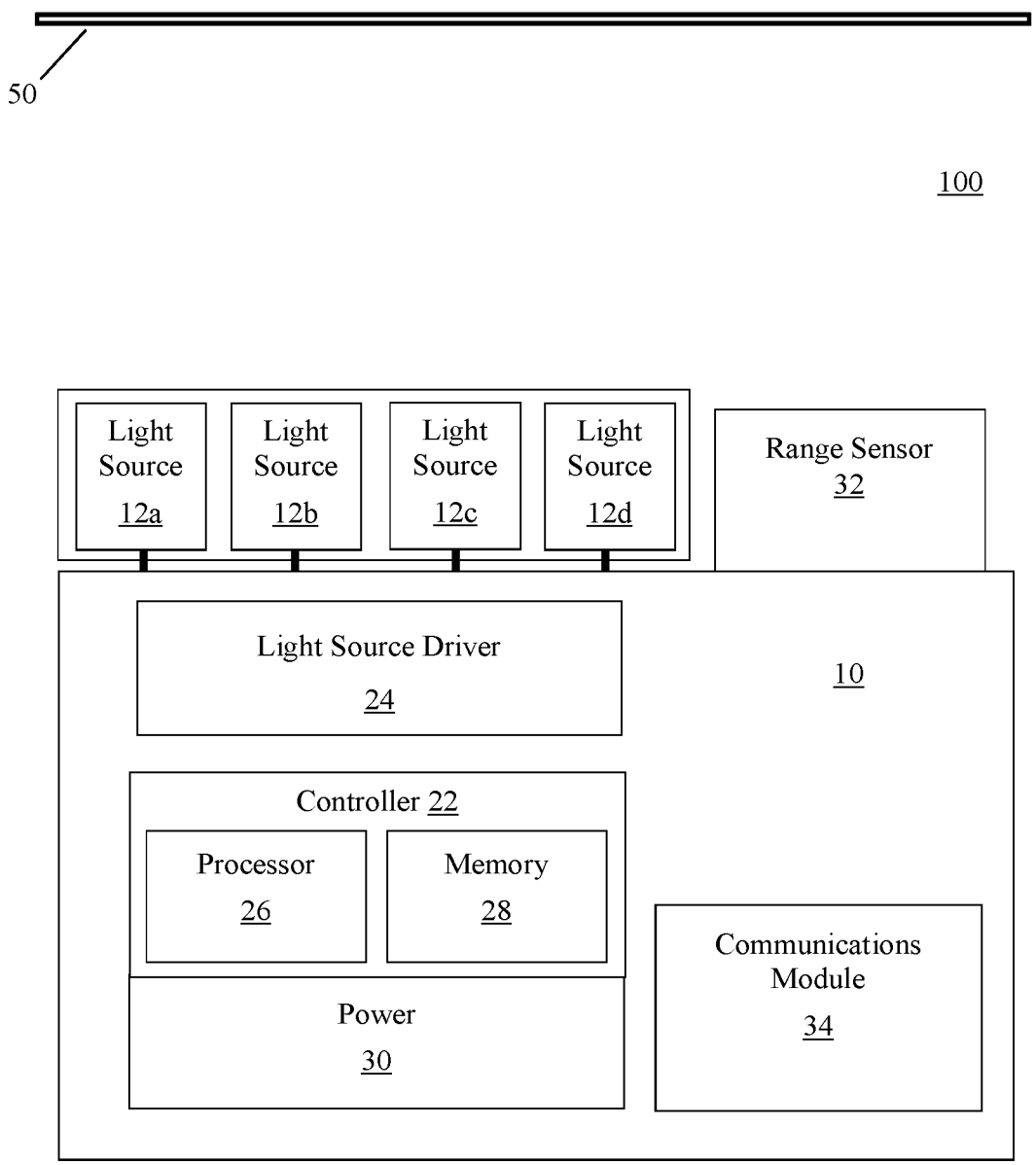
FIG. 1 is a schematic representation of a lighting unit comprising an integrated range sensor, in accordance with an embodiment.

Referring to FIG. 1, in one embodiment, a lighting unit 10 is provided that includes one or more light sources 12, where one or more of the light sources may be an LED-based light source. Further, the LED-based light source may have one or more LEDs. The light source can be driven to emit light of predetermined character (i.e., color intensity, color temperature) by one or more light source drivers 24. Many different numbers and various types of light sources (all LED-based light sources, LED-based and non-LED-based light sources alone or in combination, etc.) adapted to generate radiation of a variety of different colors may be employed in the lighting unit 10. According to an embodiment, lighting unit 10 can be any type of lighting fixture, including but not limited to a night light, a street light, a table lamp, or any other interior or exterior lighting fixture. According to an embodiment, lighting unit 10 is configured to illuminate all or a portion of a target surface 50 within the lighting environment 100.

According to an embodiment, lighting unit 10 includes a controller 22 that is configured or programmed to output one or more signals to drive the one or more light sources 12a-d and generate varying intensities, directions, and/or colors of light from the light sources. For example, controller 22 may be programmed or configured to generate a control signal for each light source to independently control the intensity and/or color of light generated by each light source, to control groups of light sources, or to control all light sources together. According to another aspect, the controller 22 may control other dedicated circuitry such as light source driver 24 which in turn controls the light sources so as to vary their intensities. Controller 22 can be or have, for example, a processor 26 programmed using software to perform various functions discussed herein, and can be utilized in combination with a memory 28. Memory 28 can store data, including one or more lighting commands or software programs for execution by processor 26, as well as various types of data including but not limited to specific identifiers for that lighting unit. For example, the memory 28 may be a non-transitory computer readable storage medium that includes a set of instructions that are executable by processor 26, and which cause the system to execute one or more of the steps of the methods described herein.

Controller 22 can be programmed, structured and/or configured to cause light source driver 24 to regulate the intensity and/or color temperature of light source 12 based on predetermined data, such as ambient light conditions, among others, as will be explained in greater detail hereinafter. According to one embodiment, controller 22 can also be programmed, structured and/or configured to cause light source driver 24 to regulate the intensity and/or color temperature of light source 12 based on communications received by a wireless communications module 34.

Lighting unit 10 also includes a source of power 30, most typically AC power, although other power sources are possible including DC power sources, solar-based power sources, or mechanical-based power sources, among others. The power source may be in operable communication with a power source converter that converts power received from an external power source to a form that is usable by the lighting unit. In order to provide power to the various components of lighting unit 10, it can also include an AC/DC converter (e.g., rectifying circuit) that receives AC power from an external AC power source 30 and converts it into direct current for purposes of powering the light unit's components. Additionally, lighting unit 10 can include an energy storage device, such as a rechargeable battery or capacitor, that is recharged via a connection to the AC/DC converter and can provide power to controller 22 and light source driver 24 when the circuit to AC power source 30 is opened.

In addition, lighting unit 10 includes a range sensor 32 which is connected to an input of controller 22 and collects range information in the vicinity of lighting unit 10 and can transmit data to controller 22, or externally via communications module 34, that is representative of the range information it collects. According to an embodiment, the range sensor is a spot or single-pixel sensor, or a time-of-flight sensing element. A time-of-flight sensing element, for example, is able to detect radiation emitted from an emitter, and this sensing is synchronized with the emission of the radiation from the emitter. The emitter may be a dedicated emitter which may be part of the time-of-flight camera. According to an embodiment, the radiation could be visible light modulated with an identifiable signal to distinguish it from the rest of the light in the environment of the lighting unit. Alternatively the radiation used in the time-of-flight sensing may be from the by the light source 12 which is already emitting visible light into the environment of the lighting unit for the purpose of illumination.

Some of the emitted radiation will be reflected back towards the time-of-flight camera. As it is synchronized with the emission, the time of flight sensor can be used to determine the amount of time between emission from the emitter and reception back at the sensing element, i.e. time-of-flight information. Further, the sensing element takes the form of a two-dimensional pixel array, and is able to associate a time-of-flight measurement with a measurement of the radiation captured by some or all of the individual pixels. Thus the time-of-flight sensor is operable to capture a depth-aware image in its sensing region, often referred to as a field of view. Details of time-of-flight based image sensing will be familiar to a person skilled in the art, and are not described in any further detail herein. While a time-of-flight camera is described herein, the imager may be a laser scanner or structured light camera, matrix array camera, or any other sensor capable of extracting depth information.

In some embodiments, range sensor 32 is remotely located on or near the lighting unit 10 and transmits obtained data to wireless communications module 34 of the lighting unit. The wireless communications module 34 can be, for example, Wi-Fi, Bluetooth, IR, radio, or near field communication that is positioned in communication with controller 22 or, alternatively, controller 22 can be integrated with the wireless communications module.

Figure 2:
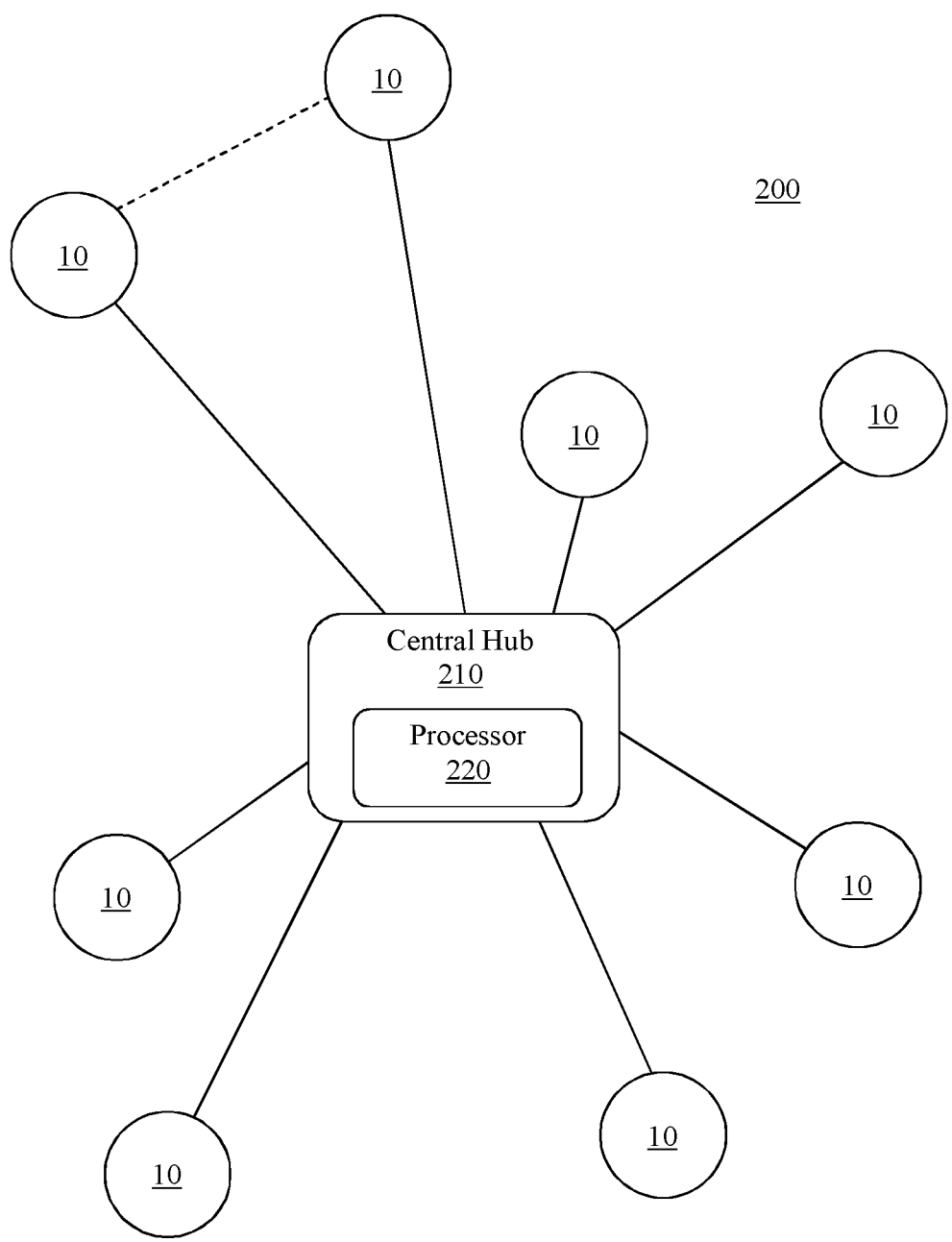
FIG. 2 is a schematic representation of a lighting system, in accordance with an embodiment.

Referring to FIG. 2, in one embodiment, is a distributed lighting system network 200 comprising a plurality of lighting units 10 each with an integrated range sensor configured to obtain range information in the vicinity of the lighting unit. The lighting units to can be any of the embodiments described herein or otherwise envisioned, and can include any of the components of the lighting units described in conjunction with FIG. 1, such as one or more light sources 12, light source driver 24, controller 22, and wireless communications module 34, among other elements. Each lighting unit 10 comprises an integrated range sensor 32.

The plurality of lighting units 10 can be configured to communicate with each other and/or with a central computer, server, or other central hub 210. One or more aspects of the functionality of the methods and systems described or otherwise envisioned herein may occur within the central hub 210 rather than within the individual lighting units. For example, the central hub may extract information from data captured by one or more lighting units and transmitted or otherwise communicated to the central hub. According to an embodiment, lighting network 200 comprises a central processor 220, which can perform one or more functions of the system. For example, the central hub 210 can comprise a processor 220.

According to an embodiment, the distributed lighting system network 200 comprises a town, village, city, street, parking lot, or any other location. The network may comprise two lighting units or many thousands of lighting units. The network may be implemented in a rural setting, suburban setting, urban setting, or a combination thereof.

Referring to FIG. 3, in one embodiment, a flow chart illustrating a method 300 for monitoring environmental conditions within lighting environment. At step 310 of the method, a lighting network 200 comprising a plurality of lighting units 10 is provided. Lighting unit 10 can be any of the embodiments described herein or otherwise envisioned, and can include any of the components of the lighting units described in conjunction with FIGS. 1 and 2, such as one or more light sources 12, light source driver 24, controller 22, range sensor 32, and wireless communications module 34, among other elements. According to an embodiment, each lighting unit 10 is configured to illuminate all or a portion of a target surface 50.

At optional step 320 of the method, the lighting unit illuminates all or a portion of the target surface 50. According to one embodiment, the lighting unit is an outdoor lighting fixture such as a streetlight, parking lot light, or other lamp post or external lighting fixture configured to illuminate a target surface. The lighting unit may automatically illuminate the lighting environment during a predetermined period, or may be activated and deactivated by activity. According to another embodiment, the lighting unit can detect ambient light levels and based on a predetermined threshold can activate and deactivate the light sources.

At step 330 of the method, the range sensor 32 of one or more of the plurality of lighting units 10 within the lighting network 200 obtains range information within the lighting environment. The range sensor can be, for example, any range sensor capable of obtaining range information within the lighting environment. The range sensor communicates the range information to the controller 22, where the information can be analyzed and/or can be stored within memory 28. According to one embodiment, the range sensor communicates or controller 22 communicates the range data to a central hub for analysis.

The range sensor 32 or lighting unit 10 can be configured to obtain range information when desired. For example, the range sensor may obtain range data continuously, or the range sensor may obtain range data periodically, such as one every minute or multiple times per minute, among many other periods of time. According to another embodiment, the range sensor 32 or lighting unit 10 can be configured to obtain range information in response to a trigger, and/or the frequency of sampling can be increased in response to the trigger. For example, the lighting unit or network may comprise or be in communication with a weather station or other weather prediction system, and thus may be triggered to obtain range information when any precipitation or other weather event is predicted. As another option, the lighting unit or network may comprise or be in communication with a precipitation sensor, and thus may be triggered to obtain range information when any precipitation is falling on or otherwise hitting the sensor. According to yet another embodiment, the lighting unit or network may comprise or be in communication with a microphone or vibration sensor, and thus may be triggered to obtain range information when a storm including thunder is occurring within the vicinity of the lighting unit or network. The system can be configured such that a lighting unit that detects a triggering event can communicate that trigger to nearby lighting units or to a central hub, or to every other lighting unit in the network. Alternatively, the system can be configured such that a lighting unit must detect a minimum threshold of a triggering event, such as a certain number of sounds, a certain amount of precipitation, or other minimum threshold in order to minimize false triggering. The system may also be configured such that a minimum number of lighting units in a lighting network or within a sector of a lighting network are triggered before other lighting units or the lighting network is notified and/or triggered.

At optional step 340 of the method, the range or depth information is communicated from one or more of the plurality of lighting units 10 to another lighting unit 10, and/or to a central hub, computer, server, or processor 210. The lighting unit 10 may be in direct and/or networked wired and/or wireless communication with the other lighting unit 10 and/or the central hub 210. Accordingly, the other lighting unit 10 and/or the central hub 210 may be located nearby or remote from the lighting unit 10.

At optional step 350 of the method, the obtained range information at one or more of the lighting units 10 within the distributed lighting system network 200 is utilized to determine the type of precipitation or other accumulation at the lighting unit. For example, the range information may be utilized in part or in whole to determine that the accumulation is water, snow, or ice. Alternatively, the range information may be utilized in part or in whole to determine that the accumulation is sand, such as in a sand storm, or any other type of accumulation or weather event, such as lava.

At step 360 of the method, the obtained range information at one or more of the lighting units 10 within the distributed lighting system network 200 is utilized to determine the depth or level of the precipitation or other accumulation at that lighting unit. Among other methods, determining the depth or level of the precipitation or other accumulation may comprise comparing a range reading at time point T1 to a range reading at time point T2, where the difference indicates the depth of the precipitation or other accumulation. According to another embodiment, a lighting unit is programmed with or learns over time a known depth at that location, and every new range reading is compared to that known depth to identify variances.

According to an embodiment, at step 350 of the method the obtained range information is also utilized to extrapolate depth or levels of the precipitation or other accumulation at locations between two or more lighting units where depth information is not directly obtained. For example, the obtained range information can be combined with digital elevation and/or map or topology information to extrapolate depths between lighting units and thus create a detailed network-wide map of accumulation such as flooding or snow accumulation. This detailed network-wide map of accumulation can localize flooding or other dangerous conditions within the network, even if there is no flooding in the vicinity of a specific lighting unit.

At step 370 of the method, the determined depth or level of precipitation or other accumulation is analyzed to determine whether flooding or another dangerous environmental condition such as icing, stagnant water, or a sand storm exists at the lighting unit or otherwise within the distributed lighting network. For example, the determined depth or level of precipitation or other accumulation can be compared to previous depths or levels, and a change can indicate flooding or another dangerous environmental condition. Alternatively, the depth or level of precipitation or other accumulation can be compared to a predetermined, programmed, or learned threshold, and meeting or exceeding that threshold can indicate that flooding or another dangerous environmental condition exists.

At step 380 of the method, the lighting unit 10 and/or lighting network 200 communicates the determined flooding or other dangerous environmental condition to a central hub, a remote server, or a management center. This allows for an alert or other communication of the determined flooding or other dangerous environmental condition, which helps people or equipment to respond to the event. For example, a central hub may comprise or be in communication with a weather station, weather monitor, television station, radio station, or other alerting mechanism in order to provide an alert. For example, the information may be broadcast via direct feedback through loudspeakers installed in the city, or via mobile communication such as an SMS alert to users. For example, emergency systems are capable of triggering an emergency alert in all mobile phones located within a specific location. The communication from the lighting unit 10 and/or lighting network 200 may comprise a location of the lighting unit, a unique identifier of the lighting unit, depth information, time information, duration of the weather event, historical depth information, and/or any other information possessed by the lighting unit or system.

At step 390 of the method, the lighting unit 10 and/or lighting network 200 responds to the determined flooding or other dangerous environmental condition by modifying a light source, displaying an alerting light, text, or sound, or providing any other alert or information that can be perceived and used to avoid casualties, fatalities, or other danger as a result of the detected weather event. For example, light signalling may comprise, among other things, changes in the light spectrum (intensity/hue) or beam profile, such as a flashing red light or other alert. As another example, the lighting unit may actively project information on the surface of the road, water, snow, sand, lava, or other accumulation or surface. Many other modifications of the lighting unit and/or other response methods are possible.

According to an embodiment, the lighting unit 10 and/or lighting network 200 is configured to monitor a determined flooding or other dangerous environmental condition over time. Accordingly, at optional step 392 of the method, the system obtains additional range readings continuously or at periodic intervals and comparing the results to previous readings. The existence of a flooding or other dangerous environmental condition that doesn't change over time may indicate persistent or stagnant water, snow, ice, or other accumulation. If the state does change over time, such as with melting snow, the system can obtain and communicate this information. According to an embodiment, if the system determines that the flooding or other dangerous environmental condition no longer exists, the method can return to step 390 and can deactivate a modification of the light source or other alert that previously existed at that location.

According to another embodiment, the lighting unit 10 and/or lighting network 200 is configured to utilize environmental information that is either obtained within the lighting environment or lighting network or is obtained from one or more external sources is utilized to modify information about a determined flooding or other dangerous environmental condition. For example, information such as ambient/remote temperature, humidity, dew point, current pressure, pressure change, and/or other information could have an impact on some conditions or forms of precipitation, such as ice or snow melting into water. This information could be utilized to predict a different and/or more dangerous condition, and the system could be configured to extrapolate this to the rest of the network, among other uses. According to an embodiment, the detected or obtained or extrapolated environmental information can be utilized to predict the alleviation or cessation of the dangerous condition. For example, a change in temperature detected by the system or communicated to the system could indicate that precipitation will dry up or lava will solidify, among many other possible outcomes.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for detecting a dangerous environmental condition within a lighting environment, the method comprising the steps of:
   providing a lighting network comprising a plurality of lighting units each comprising a light source, one or more of the plurality of lighting units comprising a range sensor;
   obtaining, by the range sensors, range information;
   determining, based at least in part on the obtained range information, a depth of precipitation or accumulation at a first lighting unit;
   determining, based on the determined depth, a dangerous environmental condition at the first lighting unit; and
   extrapolating, by the lighting network, a dangerous environmental condition at a location within the lighting network other than at the first lighting unit, the extrapolation comprising combining the obtained range information with additional information comprising elevation or topology information to infer depth information between two or more lighting units where the depth information is not directly obtainable.

2. The method of claim 1, wherein the dangerous environmental condition comprises flooding.

3. The method of claim 1, wherein the dangerous environmental condition comprises snow or ice accumulation.

4. The method of claim 1, further comprising the step of determining, using the range information, a type of precipitation or accumulation at a lighting unit.

5. The method of claim 1, further comprising the step of communicating, by the lighting unit, the range information.

6. The method of claim 1, further comprising the step of communicating the determined dangerous environmental condition at the first lighting unit.

7. The method of claim 1, further comprising the step of responding, by at least one of the plurality of lighting units, to the determined dangerous environmental condition.

8. The method of claim 7, wherein the step of responding to the determined dangerous environmental condition comprises modifying the light source of the at least one of the plurality of lighting units.

9. The method of claim 1, wherein the range sensor is a time-of-flight sensor.

10. A lighting unit configured to detect a dangerous environmental condition within a lighting environment, the lighting unit comprising:
    a light source configured to illuminate at least a portion of the lighting environment;

a range sensor configured to obtain one or more range measurements within the lighting environment;

a controller configured to: (i) determine, based at least in part on the obtained one or more range measurements, a depth of precipitation or accumulation within the lighting environment; (ii) determine, based on the determined depth, a dangerous environmental condition at the lighting unit; and (iii) extrapolate a dangerous environmental condition at a location within the lighting environment other than at the lighting unit, the extrapolation comprising combining the obtained range measurements with additional information comprising elevation or topology information to infer depth information between two or more lighting units where the depth information is not directly obtainable.

11. The lighting unit of claim 10, wherein the controller is further configured to modify, in response to a determined dangerous environmental condition, the light source of the lighting unit.

12. The lighting unit of claim 10, wherein the controller is further configured to communicate the determined dangerous environmental condition.

13. The lighting network of claim 10, wherein the controller is further configured to modify, in response to a determined dangerous environmental condition, the light source of at least one of the plurality of lighting units.

14. A lighting network configured to detect a dangerous environmental condition within a lighting environment, the lighting network comprising:

a plurality of lighting units each comprising a light source, one or more of the plurality of lighting units comprising a range sensor, wherein each of the range sensors is configured to obtain one or more range measurements within the lighting environment; and a processor configured to: (i) determine, based at least in part on the obtained one or more range measurements, a depth of precipitation or accumulation within the lighting environment; (ii) determine, based on the determined depth, a dangerous environmental condition at one or more of the plurality of lighting units; and (iii) extrapolate a dangerous environmental condition at a location within the lighting network, the extrapolation comprising combining the obtained range measurements with additional information comprising elevation or topology information to infer depth information between two or more lighting units where the depth information is not directly obtainable.

* * * * *